(12) United States Patent
Nguyen

(10) Patent No.: US 7,044,224 B2
(45) Date of Patent: May 16, 2006

(54) PERMEABLE CEMENT AND METHODS OF FRACTURING UTILIZING PERMEABLE CEMENT IN SUBTERRANEAN WELL BORES

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 203 days.

(21) Appl. No.: 10/608,373

(22) Filed: Jun. 27, 2003

(65) Prior Publication Data

US 2004/0261999 A1 Dec. 30, 2004

(51) Int. Cl.
*E21B 43/26* (2006.01)
(52) U.S. Cl. .............................. 166/308.1; 166/308.2; 166/283; 166/281; 166/307; 507/269; 106/772; 106/724; 106/778; 106/729; 106/727; 106/692; 106/600
(58) Field of Classification Search ............. 166/308.1, 166/308.2, 283, 281, 307; 507/269; 106/724, 106/729, 727, 772, 778, 692, 600
See application file for complete search history.

(56) References Cited

U.S. PATENT DOCUMENTS

| | | | |
|---|---|---|---|
| 2,238,671 A | 4/1941 | Woodhouse ................. 166/21 |
| 2,703,316 A | 3/1955 | Schneider .................. 260/78.3 |
| 3,173,484 A | 3/1965 | Huitt et al. |
| 3,195,635 A | 7/1965 | Fast |
| 3,272,650 A | 9/1966 | MacVittie ..................... 134/7 |
| 3,302,719 A | 2/1967 | Fischer |
| 3,364,995 A | 1/1968 | Atkins et al. |
| 3,366,178 A | 1/1968 | Malone et al. |
| 3,455,390 A | 7/1969 | Gallus |
| 3,784,585 A | 1/1974 | Schmitt et al. ............. 260/861 |
| 3,818,991 A * | 6/1974 | Nimerick ..................... 166/283 |
| 3,819,525 A | 6/1974 | Hattenbrun ................. 252/132 |
| 3,828,854 A | 8/1974 | Templeton et al. ......... 166/307 |
| 3,868,998 A | 3/1975 | Lybarger et al. ............ 166/278 |
| 3,912,692 A | 10/1975 | Casey et al. ................ 260/78.3 |
| 3,948,672 A | 4/1976 | Harnsberger ................ 106/720 |
| 3,955,993 A | 5/1976 | Curtice et al. .............. 106/662 |
| 3,960,736 A | 6/1976 | Free et al. ............. 252/8.55 R |
| 3,968,840 A | 7/1976 | Tate |
| 3,998,744 A | 12/1976 | Arnold et al. |
| 4,068,718 A | 1/1978 | Cooke, Jr. et al. |
| 4,169,798 A | 10/1979 | DeMartino ............. 252/8.55 R |
| 4,172,066 A | 10/1979 | Zweigle et al. ....... 260/29.6 TA |
| 4,210,455 A * | 7/1980 | Metcalf et al. ............. 106/727 |
| 4,387,769 A | 6/1983 | Erbstoesser et al. ........ 166/295 |
| 4,460,052 A | 7/1984 | Gockel ......................... 175/72 |
| 4,470,915 A | 9/1984 | Conway ................ 252/8.55 R |
| 4,498,995 A | 2/1985 | Gockel .................... 252/8.5 LC |
| 4,526,695 A * | 7/1985 | Erbstoesser et al. ........ 507/219 |
| 4,694,905 A | 9/1987 | Armbruster ................. 166/280 |
| 4,715,967 A | 12/1987 | Bellis ........................ 252/8.551 |
| 4,716,964 A | 1/1988 | Erbstoesser et al. ........ 166/284 |
| 4,785,884 A | 11/1988 | Armbruster ................. 166/280 |
| 4,797,262 A | 1/1989 | Dewitz ........................ 422/142 |
| 4,809,783 A | 3/1989 | Hollenbeck et al. ........ 166/307 |
| 4,817,721 A | 4/1989 | Pober .......................... 166/295 |
| 4,843,118 A | 6/1989 | Lai et al. ..................... 524/555 |
| 4,848,467 A | 7/1989 | Cantu et al. ................. 166/281 |
| 4,886,354 A | 12/1989 | Welch et al. ................. 356/70 |
| 4,957,165 A | 9/1990 | Cantu et al. ................. 166/295 |
| 4,961,466 A | 10/1990 | Himes et al. ................ 166/250 |
| 4,986,353 A | 1/1991 | Clark et al. .................. 166/279 |
| 4,986,354 A | 1/1991 | Cantu et al. ................. 166/279 |
| 4,986,355 A | 1/1991 | Casad et al. ................. 166/295 |
| 5,082,056 A | 1/1992 | Tackett, Jr. ................. 166/295 |
| 5,142,023 A | 8/1992 | Gruber et al. .............. 528/354 |
| 5,147,459 A * | 9/1992 | Lynn et al. .................. 106/601 |
| 5,216,050 A | 6/1993 | Sinclair ....................... 524/108 |
| 5,247,059 A | 9/1993 | Gruber et al. .............. 528/354 |
| 5,249,628 A | 10/1993 | Surjaatmadja ............... 166/305 |
| 5,295,542 A | 3/1994 | Cole et al. ................... 166/278 |
| 5,325,923 A | 7/1994 | Surjaatmadja et al. ...... 166/308 |
| 5,330,005 A | 7/1994 | Card et al. ................... 166/280 |
| 5,359,026 A | 10/1994 | Gruber ........................ 528/354 |
| 5,360,068 A | 11/1994 | Sprunt et al. ................ 166/259 |

(Continued)

FOREIGN PATENT DOCUMENTS

EP 0 510 762 A2 4/1992

(Continued)

OTHER PUBLICATIONS

U.S. Appl. No. 09/774,881, filed Apr. 2002, McDaniel et al.*

(Continued)

*Primary Examiner*—Brian E. Glessner
*Assistant Examiner*—Bryan A. Fuller
(74) *Attorney, Agent, or Firm*—Robert A. Kent; Baker Botts

(57) ABSTRACT

The present invention relates to methods of stimulating a subterranean formation. More particularly, but not by way of limitation, the present invention relates to methods of fracturing subterranean formations utilizing a fracturing fluid comprising a permeable cement composition that may be used as a propping agent. One method of stimulating a subterranean formation of the present invention comprises the following steps: preparing a permeable cement composition comprising a hydraulic cement, water, and a degradable material capable of undergoing an irreversible degradation downhole; injecting the permeable cement composition into the subterranean formation at a pressure sufficient to create a fracture in the subterranean formation; and allowing the permeable cement composition to form a proppant matrix having voids in the fracture.

68 Claims, No Drawings

U.S. PATENT DOCUMENTS

| | | | |
|---|---|---|---|
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,566,759 A * | 10/1996 | Tjon-Joe-Pin et al. | 166/300 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | |
| 5,670,473 A | 9/1997 | Scepanski | 510/445 |
| 5,696,059 A * | 12/1997 | Onan et al. | 507/269 |
| 5,698,322 A | 12/1997 | Tsai et al. | 428/373 |
| 5,765,642 A | 6/1998 | Surjaatmadja | 166/297 |
| 5,791,415 A | 8/1998 | Nguyen et al. | 166/280 |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | 166/280 |
| 5,964,291 A | 10/1999 | Bourne et al. | 166/279 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | |
| 6,135,987 A | 10/2000 | Tsai et al. | 604/365 |
| 6,143,698 A | 11/2000 | Murphey et al. | |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/204 |
| 6,242,390 B1 | 6/2001 | Mitchell et al. | 507/211 |
| 6,260,622 B1 | 7/2001 | Blok et al. | 166/305.1 |
| 6,302,209 B1 * | 10/2001 | Thompson et al. | 166/305.1 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,330,916 B1 * | 12/2001 | Rickards et al. | 166/280.2 |
| 6,357,527 B1 | 3/2002 | Norman et al. | 166/300 |
| 6,364,945 B1 | 4/2002 | Chatterji et al. | 106/677 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | |
| 6,422,314 B1 | 7/2002 | Todd et al. | 166/312 |
| 6,454,003 B1 | 9/2002 | Chang et al. | 166/270 |
| 6,485,947 B1 | 11/2002 | Rajgarhia et al. | 435/139 |
| 6,488,763 B1 | 12/2002 | Brothers et al. | 106/692 |
| 6,494,263 B1 | 12/2002 | Todd | 166/312 |
| 6,508,305 B1 | 1/2003 | Brannon et al. | 166/293 |
| 6,527,051 B1 | 3/2003 | Reddy et al. | 166/300 |
| 6,554,071 B1 | 4/2003 | Reddy et al. | 166/293 |
| 6,569,814 B1 | 5/2003 | Brady et al. | 507/201 |
| 6,599,863 B1 | 7/2003 | Palmer et al. | 507/219 |
| 6,667,279 B1 | 12/2003 | Hessert et al. | 507/225 |
| 6,669,771 B1 | 12/2003 | Tokiwa et al. | 106/162 |
| 6,681,856 B1 | 1/2004 | Chatterji et al. | 166/294 |
| 6,686,328 B1 | 2/2004 | Binder | 510/446 |
| 6,702,023 B1 | 3/2004 | Harris et al. | 166/307 |
| 6,710,019 B1 | 3/2004 | Sawdon et al. | 507/136 |
| 6,761,218 B1 | 7/2004 | Nguyen et al. | |
| 6,763,888 B1 | 7/2004 | Harris et al. | 166/305.1 |
| 6,817,414 B1 | 11/2004 | Lee | 166/278 |
| 2001/0016562 A1 | 8/2001 | Muir et al. | 507/201 |
| 2002/0036088 A1 | 3/2002 | Todd | |
| 2002/0125012 A1 | 9/2002 | Dawson et al. | |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vallmer | 507/100 |
| 2003/0188766 A1 | 10/2003 | Banerjee et al. | 134/7 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0094300 A1 | 5/2004 | Sullivan et al. | 166/308.1 |
| 2004/0106525 A1 | 6/2004 | Willbert et al. | 507/200 |
| 2004/0152601 A1 | 8/2004 | Still et al. | 507/100 |
| 2004/0152602 A1 | 8/2004 | Boles | 507/100 |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Munoz, Jr. et al. | 166/279 |
| 2005/0006095 A1 | 1/2005 | Justus et al. | |
| 2005/0103496 A1 | 5/2005 | Todd et al. | 166/278 |
| 2005/0252659 A1 | 11/2005 | Sullivan et al. | 166/280.1 |

FOREIGN PATENT DOCUMENTS

| | | |
|---|---|---|
| EP | 0 879 935 | 11/1998 |
| EP | 0 879 935 A3 | 10/1999 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 2000/57022 | 9/2000 |
| WO | WO 2001/02698 | 1/2001 |
| WO | WO 01/87797 | 11/2001 |
| WO | WO 02/12674 A1 | 2/2002 |
| WO | WO 03/027431 | 4/2003 |
| WO | WO 03/027431 A2 | 4/2003 |
| WO | WO 03/027431 A3 | 4/2003 |
| WO | WO 2004/007905 | 1/2004 |
| WO | WO 04/037946 A1 | 5/2004 |
| WO | WO 04/038176 A1 | 5/2004 |

OTHER PUBLICATIONS

Cantu, et al., "Laboratory and Field Evaluation of a Combined Fluid-Loss-Control Additive and Gel Breaker for Fracturing Fluids," SPE Paper 18211 (1990).

Simmons, et al., "Poly(phenyllactide): Synthesis, Characterization, and Hydrolytic Degradation," Biomacromolecules, vol. 2, No. 3, 2001 (pp. 658-663).

Yin, et al., "Preparation and Characterization of Substituted Polylactides," Am. Chem. Soc., vol. 32, No. 23, 1999 (pp. 7711-7718).

Yin, et al., "Synthesis and Properties of Polymers Derived form Substituted Lactic Acids," Am. Chem. Soc., Ch. 12, 2001 (pp. 147-159).

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795), undated.

Vichaibun, et al, *A New Assay for the Enzymatic Degradation of Polylactic Acid, Short Report*, ScienceAsia, vol. 29, 2003 (pp. 297-300).

Halliburton, *SurgiFrac$^{SM}$ Service, A Quick and Cost-Effective Method to Help Boost Production From Openhole Horizontal Completions*, Halliburton Communications, HO3297, 2002.

Halliburton, *Cobra Frac$^{SM}$ Service, Coiled Tubing Fracturing—Cost-Effective Method for Stimulating Untapped Reserves*, HO2319R, Halliburton Energy Services, 2000.

Halliburton, *CobraJet Frac$^{SM}$ Service, Cost-effective Technology That Can Help Reduce Cost Per BOE Produced, Shorten Cycle Time and Reduce Capex*, Halliburton Communications, undated.

Blauch, et al, *Aqueous Tackifier and Methods of Controlling Particulates*, U.S. Appl. No. 10/864,061, filed Jun. 9, 2004.

Blauch, et al, *Aqueous-Based Tackifier Fluids and Methods of Use*, U.S. Appl. No. 10/864,618, filed Jun. 9, 2004.

Y. Chiang et al.: "Hydrolysis of Ortho Esters: Further Investigation of the Factors Which Control the Rate-Determining Step," Engineering Information Inc., NY, NY, vol. 105, No. 23 (XP-002322842), Nov. 16, 1983.

M. Ahmad, et al.: Ortho Ester Hydrolysis: Direct Evidence for a Three-Stage Reaction Mechanism, Engineering Information Inc., NY, NY, vol. 101, No. 10 (XP-002322843), May 9, 1979.

Skrabal et al., *The Hydrolysis Rate of Orthoformic Acid Ethyl Ether*, Chemical Institute of the University of Graz, pp. 1-38, Jan. 13, 1921.

Heller, et al., *Poly(ortho esters)—From Concept To Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., *Release of BSA from poly(ortho ester) extruded thin strands*, Journal of Controlled Release 71, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039), undated.

Heller, et al., *Poly(ortho esters) For The Pulsed And Continuous Delivery of Peptides And Proteins*, Controlled Release and Biomedical Polymers Department, SRI International, (pp. 39-46), undated.

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug., 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemical "Trigger" Useful for Oilfield Applications*, Society of Petroleum Engineers, Inc., SPE 92709, Feb. 4, 2005.

* cited by examiner

PERMEABLE CEMENT AND METHODS OF FRACTURING UTILIZING PERMEABLE CEMENT IN SUBTERRANEAN WELL BORES

BACKGROUND OF THE INVENTION

1. Field of the Invention

The present invention relates to methods of stimulating a subterranean formation. More particularly, but not by way of limitation, the present invention relates to methods of fracturing subterranean formations utilizing a fracturing fluid comprising a permeable cement composition that may be used as a propping agent.

2. Description of the Prior Art

Hydraulic fracturing techniques are commonly used to stimulate subterranean formations to enhance the production of desirable fluids therefrom. In a conventional hydraulic fracturing process, a fracturing fluid is pumped down a well bore and into a fluid-bearing formation. The fracturing fluid is pumped into the formation under a pressure sufficient to create or enlarge fissures in the formation. Packers can be positioned in the well bore as necessary to direct and confine the fracturing fluid to the portion of the subterranean formation which is to be fractured. Typically, fracturing pressures range from about 1,000 psi to about 15,000 psi or more, depending on the depth and the nature of the formation being fractured.

Fracturing fluids used in conventional hydraulic fracturing techniques include: fresh water, brine, liquid hydrocarbons, gelled water, or gelled brine. The fracturing fluid may contain a viscosifying or gelling agent to increase its viscosity. The fracturing fluid typically also will contain a proppant that will be deposited in the fractures. Commonly used proppants include particulate materials like sand, walnut shells, glass beads, metal pellets, and ceramic beads. These may or may not be coated with a curable resin or used in conjunction with a tackifying agent. The proppants are deposited in the resultant fractures to prevent the fractures from closing so as to enhance the flow of desirable fluids to the well bore.

When the fracturing fluid comprising proppant particles is in place in the formation and the pumping operation is discontinued, the proppant material will typically settle within the gelled aqueous carrier fluid to some degree before the fractures close. As a result of this settling, the proppant pack may form at an interval different than the desired interval. Further, the gelling agents (e.g., polysaccharides such as guar and its derivatives) used in these fracturing fluids can form residues in the proppant pack and in the surrounding formation area which may reduce fluid conductivity.

Additionally, conventional hydraulic fracturing techniques have generally not been effective in unconsolidated formations. An unconsolidated formation will typically have little or no strength. When such a formation is subjected to a conventional hydraulic fracturing procedure, the formation particulate material tends to move and reconsolidate. Consequently, a substantial quantity becomes mixed with the proppant, which thereby reduces the permeability of the proppant bed. Alternatively, the proppant will sometimes simply become embedded in the formation, which is also undesirable. Further, due to the typically high initial permeability of an unconsolidated formation, the fluid component of a fracturing fluid/proppant mixture will tend to separate from the proppant and leak into the formation. When such separation occurs, generally it is difficult to then establish a sufficient hydraulic fracture able to pass and transport the proppant. As a result, the proppant will not be placed in the fissures at sufficient distances from the well bore and in sufficient concentrations to yield a substantial increase in flow capacity.

There have been attempts to use cement compositions as propping agents to maintain the integrity of subterranean fractures. Cement compositions are desirable in this application because of their high strength and low cost. In conventional methods, such cement compositions when used as propping agents often contain particulate carbonate salts. In theory, when removed from the cement composition at some point before the cement composition has substantial compressive strength, the resultant cement matrix has some degree of permeability, which allows formation fluids to flow to the well bore. Carbonate salts, however, require an acid to dissolve out of the cement composition. Acid treatment is unreliable because acid tends to find the path of least resistance within the cement composition, which results in uneven distribution or coverage of acid and resultant removal of carbonate salt particulate. Thus, the resultant permeability is not sufficient for hydrocarbon production. Moreover, the use of acid undermines the integrity of the cement by destabilizing the structure of the cement matrix, thus weakening the cement strength or consolidation.

SUMMARY OF THE INVENTION

The present invention relates to methods of stimulating a subterranean formation. More particularly, but not by way of limitation, the present invention relates to methods of fracturing subterranean formations utilizing a fracturing fluid comprising a permeable cement composition that may be used as a propping agent.

One method of stimulating a subterranean formation of the present invention comprises the following steps: preparing a permeable cement composition comprising a hydraulic cement, water, and a degradable material capable of undergoing an irreversible degradation downhole; injecting the permeable cement composition into the subterranean formation at a pressure sufficient to create a fracture in the subterranean formation; and allowing the permeable cement composition to form a proppant matrix having voids in the fracture.

One method of maintaining the integrity of a fracture in a subterranean formation comprises the following steps: placing a permeable cement composition comprising a hydraulic cement, water, and a degradable material capable of undergoing an irreversible degradation downhole in the fracture, and allowing the permeable cement composition to form a permeable cement proppant matrix in the fracture.

A method of forming a permeable cement proppant matrix in a fracture in a subterranean formation comprises the steps of: placing a permeable cement composition comprising a hydraulic cement, water, and a degradable material capable of undergoing an irreversible degradation downhole in the fracture, and allowing the permeable cement composition to form a permeable cement proppant matrix in the fracture.

An embodiment of a fracturing fluid of the present invention comprises a hydraulic cement, water, and a degradable material capable of undergoing an irreversible degradation downhole.

One embodiment of the permeable cement compositions of the present invention comprises a hydraulic cement, water, and a degradable material capable of undergoing an irreversible degradation downhole.

The objects, features and advantages of the present invention will be readily apparent to those skilled in the art upon a reading of the description of the preferred embodiments which follows.

DESCRIPTION OF PREFERRED EMBODIMENTS

The present invention provides improved well stimulation methods wherein the well stimulation fluid also acts as a formation stabilizer and/or consolidation aid. The well stimulation fluids of the present invention do not contain materials that, for example, would contaminate potable water aquifers and other formations. Moreover, the well stimulation fluids of the present invention will form and fill fissures extending some distance from the well bore, will not leave undesirable residues, emulsions, and the like, and may exert relatively low hydrostatic pressures on weak subterranean formations. Also, because of its desirable fluid efficiency, e.g., negligible fluid loss to the formation, relatively low pump rates or hydraulic horsepower is necessary to perform the fracturing treatment.

A permeable cement composition of the present invention is provided in the present invention which forms a permeable cement proppant matrix in a fracture in a subterranean formation, inter alia, to maintain the integrity of the fracture and prevent the production of particulates with well fluids. The permeable cement compositions of the present invention are prepared on the surface (either on-the-fly or by a pre-blending process), and then injected into the subterranean formation and/or into fractures or fissures therein by way of a well bore under a pressure sufficient to perform the desired function. When the fracturing or placement process is completed, the permeable cement composition is allowed to set in the formation fracture(s). A sufficient amount of pressure may be required to maintain the permeable cement composition during the setting period, inter alia, to prevent the composition from flowing out of the formation fractures. When set, the resultant permeable cement proppant matrix is sufficiently permeable to allow oil, gas, and/or other formation fluids to flow therethrough, but will not allow the migration of substantial quantities of undesirable particulates to the well bore. Moreover, the resultant permeable cement proppant matrix has sufficient compressive strength to maintain the integrity of the fracture(s) in the formation.

The matrix has sufficient strength to substantially act as a propping agent, e.g., to maintain the integrity of the fracture(s) in the formation to enhance the conductivity of the formation. Importantly, while acting as a propping agent, the matrix also provides permeable flow channels within the formation which facilitate the flow of desirable formation fluids to the well bore. In some embodiments, the permeable cement proppant matrix will have a permeability ranging from about 0.1 darcies to about 50 darcies; in other preferred embodiments, the permeable cement proppant matrix will have a permeability of above about 10 darcies.

The permeable cement compositions of the present invention comprise a hydraulic cement, water, and a degradable material that is capable of undergoing an irreversible degradation downhole. The term "irreversible" as used herein means that the degradable material once degraded downhole, should not recrystallize or reconsolidate while downhole, e.g., the degradable material should degrade in situ but not recrystallize or reconsolidate in situ. The terms "degradation," "degradable", and the like when used herein refer to both the two relatively extreme cases of hydrolytic degradation that the degradable material may undergo, i.e., heterogeneous (or bulk erosion) and homogeneous (or surface erosion), and any stage of degradation in between these two. This degradation may be a result of, inter alia, a chemical or thermal reaction or a reaction induced by radiation.

The degradable material is incorporated into the permeable cement composition and becomes distributed throughout the resultant cement proppant matrix, most preferably uniformly, as the cement proppant matrix forms. After the requisite time period dictated by the characteristics of the particular degradable material utilized, the degradable material undergoes an irreversible degradation. This degradation, in effect, causes the degradable material to substantially be removed from the proppant matrix. As a result, voids are created in the proppant matrix. These voids enhance the permeability of the matrix, which results in, inter alia, enhanced fracture conductivity. Enhanced fracture conductivity enhances well productivity, as well productivity is a function of, inter alia, fracture conductivity. In certain preferred embodiments, these voids are channel-like and interconnected so that the permeability of the matrix is enhanced.

A variety of hydraulic cements are suitable in the compositions and methods of the present invention, including those comprised of calcium, aluminum, silicon, oxygen, and/or sulfur, which set and harden by reaction with water. Such hydraulic cements include, but are not limited to, Portland cements, pozzolanic cements, gypsum cements, high alumina content cements, silica cements, and high alkalinity cements. Portland cements are generally preferred. In some embodiments, the Portland cements that are suited for use in conjunction with the present invention are classified as Class A, B, C, G, and H cements according to American Petroleum Institute, *API Specification for Materials and Testing for Well Cements,* API Specification 10, Fifth Ed., Jul. 1, 1990. Another useful cement for certain embodiments of the present invention include a cement that is commercial available under the tradename "THERMALOCK™" from Halliburton Energy Services, Inc., in Duncan, Okla., and described in U.S. Pat. No. 6,488,763, herein incorporated by reference. The cement component of the compositions of the present invention comprises about 20% to about 70% of the weight of the composition.

Low-density cements are also suitable for use in the compositions and methods of the present invention. Such low-density cements may be foamed cements or may be cements whose density has been reduced by another means including microspheres, low-density elastic beads, or other density-reducing additives. If a low-density cement is utilized, then a mixture of foaming and foam stabilizing surfactants may be used if appropriate. One of ordinary skill in the art with the benefit of this disclosure will recognize when such agents should be used. Generally, if included, the mixture of foaming and foam stabilizing surfactants may be included in the cement compositions of the present invention in an amount in the range of from about 1% to about 5% by volume of water in the composition.

The water utilized in the cement compositions of this invention can be fresh water, salt water (e.g., water containing one or more salts dissolved therein), brine (e.g., saturated salt water), or seawater. Generally, the water can be from any source provided that it does not contain an excess of compounds that adversely affect other components in the permeable cement composition. The water preferably is present in an amount sufficient to form a pumpable slurry. More particularly, the water is present in the cement compositions in an amount in the range of from about 15% to about 40% by weight of hydraulic cement therein, more preferably in an amount of about 20% to about 35%.

Optionally, a dispersant may be included in the permeable cement compositions of the present invention. If used, the dispersant should be included in the composition in an amount effective, inter alia, to aid in dispersing the cement and the degradable material within the permeable cement composition. In certain embodiments, about 0.1% to about 5% dispersant by weight of the composition may be suitable. In other embodiments, a different range may be suitable. Examples of suitable dispersants include but are not limited to naphthalene-sulfonic-formaldehyde condensates, acetone-formaldehyde-sulfite condensates, and flucano-delta-lactone. One of ordinary skill in the art with the benefit of this disclosure will be able to determine whether use of a dispersant is beneficial and how much should be used.

In order to prevent fluid loss from a permeable cement composition of this invention during placement, optionally, a fluid loss control additive can be included in the composition. Examples of suitable cement slurry fluid loss control additives that are liquids or that can be dissolved in a liquid include but are not limited to modified synthetic polymers and copolymers, natural gum and their derivatives and derivatized cellulose and starches. If used, the fluid loss control additive generally is included in the resin composition in an amount sufficient to inhibit fluid loss from the cement composition. In some embodiments, the fluid loss additive is present in an amount ranging from about 0% to about 25% by weight of the composition.

Other additives such as accelerators (e.g., triethanola-minic calciumchloride, potassium chloride, sodium formate, sodium nitrate, and other alkali and alkaline earth metal halides, formates, nitrates, and carbonates), retardants (e.g., sodium tartrate, sodium citrate, sodium gluconate, sodium itaconate, tartaric acid, citric acid, gluconic acid, lignosul-fonates, and synthetic polymers and copolymers, thixotropic additives), suspending agents, or the like may also be included in the permeable cement compositions.

In some embodiments, e.g., where the methods of the present invention are being used to stimulate a consolidated or semi-consolidated formation, an amount of conventional proppant materials may be added to the permeable cement composition of the present invention. As used herein, the terms "consolidated" and "semi-consolidated" refer to formations which have some degree of relative structural stability as opposed to an "unconsolidated" formation, which has relatively low structural stability. When subjected to a fracturing procedure, such formations may exert very high fracture closure stresses. The proppant material may aid in maintaining the fractures propped open. If used, the proppant material must be of a sufficient size to aid in propping the fractures open, but should not negatively impact the permeability of the permeable cement proppant matrix. The general size range is about 10 to about 80 U.S. mesh. In certain preferred embodiments, the proppant may have a size in the range from about 12 to about 60 U.S. mesh. Typically, this amount will be substantially less than the amount of proppant material included in a conventional fracturing fluid process. The proppant should not be included in an amount in the composition that would negatively impact the permeability of the permeable cement proppant matrix.

Nonlimiting examples of degradable materials that may be used in conjunction with the present invention include but are not limited to degradable polymers, dehydrated salts, and/or mixtures of the two.

As for degradable polymers, a polymer is considered to be "degradable" herein if the degradation is due to, inter alia, chemical and/or radical process such as hydrolysis, oxidation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent on factors such as the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Suitable examples of degradable polymers that may be used in accordance with the present invention include but are not limited to those described in the publication of Advances in Polymer Science, Vol. 157 entitled "Degradable Aliphatic Polyesters" edited by A.-C. Albertsson. Specific examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerization, and any other suitable process may prepare such suitable polymers. Specific examples of suitable polymers include polysaccharides such as dextran or cellulose; chitin; chitosan; proteins; aliphatic polyesters; poly(lactide); poly(glycolide); poly(ϵ-caprolactone); poly(hydroxybutyrate); poly (anhydrides); aliphatic polycarbonates; poly(orthoesters); poly(amino acids); poly(ethylene oxide); and polyphosphazenes. Of these suitable polymers, aliphatic polyesters and polyanhydrides are preferred.

Aliphatic polyesters degrade chemically, inter alia, by hydrolytic cleavage. Hydrolysis can be catalyzed by either acids or bases. Generally, during the hydrolysis, carboxylic end groups are formed during chain scission, and this may enhance the rate of further hydrolysis. This mechanism is known in the art as "autocatalysis," and is thought to make polyester matrices more bulk eroding.

Suitable aliphatic polyesters have the general formula of repeating units shown below:

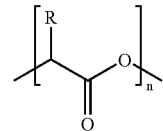

Formula I where n is an integer between 75 and 10,000 and R is selected from the group consisting of hydrogen, alkyl, aryl, alkylaryl, acetyl, heteroatoms, and mixtures thereof. Of the suitable aliphatic polyesters, poly(lactide) is preferred. Poly (lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to formula I without any limitation as to how the polymer was made such as from lactides, lactic acid, or oligomers, and without reference to the degree of polymerization or level of plasticization.

The lactide monomer exists generally in three different forms: two stereoisomers L- and D-lactide and racemic D,L-lactide (meso-lactide). The oligomers of lactic acid, and oligomers of lactide are defined by the formula:

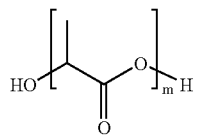

Formula II where m is an integer: $2 \leq m \leq 75$. Preferably m is an integer: $2 \leq m \leq 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention where a slower degradation of the degradable particulate is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined to be used in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified to be used in the present invention by, inter alia, blending, copolymerizing or otherwise mixing the stereoisomers, blending, copolymerizing or otherwise mixing high and low molecular weight polylactides, or by blending, copolymerizing or otherwise mixing a polylactide with another polyester or polyesters.

Plasticizers may be present in the polymeric degradable materials of the present invention. The plasticizers may be present in an amount sufficient to provide the desired characteristics, for example, (a) more effective compatibilization of the melt blend components, (b) improved processing characteristics during the blending and processing steps, and (c) control and regulation of the sensitivity and degradation of the polymer by moisture. Suitable plasticizers include but are not limited to derivatives of oligomeric lactic acid, selected from the group defined by the formula:

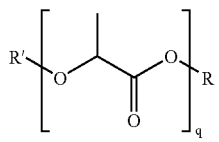

Formula III where R is a hydrogen, alkyl, aryl, alkylaryl, acetyl, heteroatom, or a mixture thereof and R is saturated, where R' is a hydrogen, alkyl, aryl, alkylaryl, acetyl, heteroatom, or a mixture thereof and R' is saturated, where R and R' cannot both be hydrogen, where q is an integer: $2 \leq q \leq 75$; and mixtures thereof. Preferably q is an integer: $2 \leq q \leq 10$. As used herein the term "derivatives of oligomeric lactic acid" includes derivatives of oligomeric lactide. In addition to the other qualities above, the plasticizers may enhance the degradation rate of the degradable polymeric materials. The plasticizers, if used, are preferably at least intimately incorporated within the degradable polymeric materials.

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosure of which are incorporated herein by reference.

Polyanhydrides are another type of particularly suitable degradable polymer useful in the present invention. Polyanhydride hydrolysis proceeds, inter alia, via free carboxylic acid chain-ends to yield carboxylic acids as final degradation products. The erosion time can be varied over a broad range of changes in the polymer backbone. Examples of suitable polyanhydrides include poly(adipic anhydride), poly (suberic anhydride), poly(sebacic anhydride), and poly (dodecanedioic anhydride). Other suitable examples include but are not limited to poly(maleic anhydride) and poly (benzoic anhydride).

The physical properties of degradable polymers depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, elongational viscosity with tension-stiffening behavior. The properties of the material utilized can be further tailored by blending, and copolymerizing it with another polymer, or by a change in the macromolecular architecture (e.g., hyperbranched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains. For example, poly(phenyllactide) will degrade at about ⅕th of the rate of racemic poly(lactide) at a pH of 7.4 at 55° C. One of ordinary skill in the art with the benefit of this disclosure will be able to determine the appropriate functional groups to introduce to the polymer chains to achieve the desired physical properties of the degradable polymers.

Dehydrated salts may be used in accordance with the present invention as a degradable material. A dehydrated salt is suitable for use in the present invention if it will degrade over time as it hydrates. For example, a particulate solid anhydrous borate material that degrades over time may be suitable. Specific examples of particulate solid anhydrous borate materials that may be used include but are not limited to anhydrous sodium tetraborate (also known as anhydrous borax), and anydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like acetate trihydrate.

Blends of certain degradable materials may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the permeable cement proppant matrix or with the production of any of the fluids from the subterranean formation.

In choosing the appropriate degradable material, one should consider the degradation products that will result. These degradation products should not adversely affect other operations or components. The choice of degradable material also can depend, at least in part, on the conditions of the well, e.g., wellbore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Dehydrated salts may also be suitable for higher temperature wells.

Also, we have found that a preferable result is achieved if the degradable material degrades slowly over time as opposed to instantaneously. Even more preferable results have been obtained when the degradable material does not begin to degrade until after the permeable cement proppant matrix has developed some compressive strength. The slow degradation of the degradable material helps, inter alia, to maintain the stability of the proppant matrix.

The specific features of the degradable material may be modified to provide the permeable cement proppant matrix with optimum conductivity while maintaining its desirable propping agent capability. Preferably, the degradable material is selected to have a size, and shape to maintain substantial uniformity within the mixture. Whichever degradable material is utilized, the degradable materials may have any shape, depending on the desired characteristics of the resultant voids in the proppant matrix including but not limited to particles having the physical shape of platelets, shavings, flakes, ribbons, rods, strips, spheroids, toroids, pellets, tablets, or any other physical shape. The physical shape of the degradable material should be chosen so as to enhance the desired shape and relative composition of the resultant voids within the proppant matrix. In certain preferred embodiments, a rod-like particle shape is used to create interconnecting channel-like voids in the permeable cement proppant matrix. One of ordinary skill in the art with the benefit of this disclosure will recognize the specific degradable material and the preferred size and shape for a given application.

The concentration of the degradable material in the permeable cement composition ranges from about 5% to about 70%, based on the weight of the cement in the mixture. A concentration of degradable material between about 20% and about 65% by weight of the proppant is preferable. Additionally, the relative amounts of the degradable material in the permeable cement composition should not be such that when degraded, an undesirable percentage of voids result in the permeable cement proppant matrix making the proppant matrix potentially ineffective in maintaining the integrity of the fracture. One of ordinary skill in the art with the benefit of this disclosure will recognize an optimum concentration of degradable material that provides desirable values in terms of enhanced conductivity or permeability without undermining the stability of the proppant pack itself.

The permeable cement compositions of the present invention can be injected into the subterranean formation at lower pressures using less costly equipment. Rates of less than 15 barrels/minute, preferably less than 10 barrels/minute, are suitable.

An example of the methods of the present invention includes the following steps. A permeable cement composition of the present invention is prepared (either on-the-fly or by a preblending process) that comprises a hydraulic cement, water, and a degradable material. The permeable cement composition is injected into the subterranean formation at a sufficient pressure to create a fracture in the formation. The permeable cement composition is allowed to set in the fracture, whereby the composition fills and forms a permeable cement proppant matrix therein. After the permeable cement proppant matrix has been formed in the well bore, the well is produced and the permeable cement proppant matrix acts, inter alia, to maintain the integrity of the fractures within the formation and allow formation fluids to flow into the well bore. Produced liquids and gases are allowed to flow through the permeable cement proppant matrix, but formation sands in the formation are substantially prevented from passing through the matrix.

Thus, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of stimulating a subterranean formation comprising the steps of:
   (a) preparing a permeable cement composition comprising a hydraulic cement, water, and a degradable material;
   (b) injecting the permeable cement composition prepared in step (a) into the subterranean formation at a pressure sufficient to create a fracture in the subterranean formation; and
   (c) allowing the permeable cement composition to set to form a proppant matrix having voids in the fracture.

2. The method of claim 1 wherein the permeable cement composition further comprises a surfactant present in an amount sufficient to disperse the hydraulic cement and the degradable material within the permeable cement composition.

3. The method of claim 2 wherein the surfactant is present in the permeable cement composition in an amount ranging from about 0.1% to about 5% by weight of the permeable cement composition.

4. The method of claim 1 wherein the hydraulic cement is chosen from the group consisting of calcium, aluminum, silicon, oxygen, and sulfur.

5. The method of claim 1 wherein the hydraulic cement is chosen from the group consisting of a Portland cement, pozzolanic cement, gypsum cement, high alumina content cement, silica cement, high alkalinity cement, and low-density cement.

6. The method of claim 1 wherein the hydraulic cement is present in the permeable cement composition in an amount ranging from about 20% to about 70% by weight of the permeable cement composition.

7. The method of claim 1 wherein the water is present in an amount sufficient to make the permeable cement composition a pumpable slurry.

8. The method of claim 1 wherein the water comprises fresh water, salt water, or brine.

9. The method of claim 1 wherein the water is present in an amount ranging from about 15% to about 40% by weight of the permeable cement composition.

10. The method of claim 1 wherein the permeable cement composition further comprises a fluid loss additive.

11. The method of claim 10 wherein the fluid loss additive is present in the permeable cement composition in an amount ranging from about 0.1% to about 25% by weight of the permeable cement composition.

12. The method of claim 1 wherein the permeable cement composition is mixed on-the-fly.

13. The method of claim 1 further comprising before step (a) blending the permeable cement composition and transporting the permeable cement composition to the well site.

14. The method of claim 1 wherein the degradable material is chosen from the group consisting of: a degradable polymer and a dehydrated salt.

15. The method of claim 14 wherein the degradable polymer is chosen from the group consisting of: polysaccharides, chitins, chitosans, proteins, aliphatic polyesters, poly(lactides), poly(glycolides), poly($\epsilon$-caprolactones), poly(hydroxybutyrates), polyanhydrides, aliphatic polycarbonates, poly(orthoesters), poly(amino acids); poly(ethylene oxides), and polyphosphazenes.

16. The method of claim 1 wherein the degradable material further comprises a plasticizer.

17. The method of claim 14 wherein the dehydrated salt is chosen from the group consisting of: anhydrous sodium tetraborate and anhydrous boric acid.

18. The method of claim 1 wherein the degradable material comprises a stereoisomer of a poly(lactide).

19. The method of claim 1 wherein the degradable material is present in an amount ranging from about 5% to about 70% by weight of the composition.

20. The method of claim 1 wherein the degradable material comprises particles having a rod-like shape.

21. The method of claim 1 wherein the voids comprise channel-like voids.

22. The method of claim 1 wherein the cement is a Portland cement present in an amount of from about 20% to about 70% by weight of the permeable cement composition; the water is fresh water present in an amount of from about 15% to about 40% by weight of the cement composition; and the degradable material is a poly(lactic acid) particulate present in an amount of from about 5% to about 70% by weight of the permeable cement composition.

23. The method of claim 1 wherein the permeable cement composition further comprises proppant particles.

24. The method of claim 1 wherein the permeable cement proppant matrix has a permeability ranging from about 1 to about 125 darcies.

25. A method of maintaining the integrity of a fracture in a subterranean formation comprising the steps of:
(a) placing a permeable cement composition that comprises a hydraulic cement, water, and a degradable material in a subterranean formation at a pressure sufficient to create or enhance at least one fracture in the formation; and
(b) allowing the permeable cement composition to set to form a permeable cement proppant matrix in the fracture.

26. The method of claim 25 wherein the permeable cement composition further comprises a surfactant present in an amount sufficient to disperse the hydraulic cement and the degradable material within the permeable cement composition.

27. The method of claim 26 wherein the surfactant is present in the permeable cement composition in an amount ranging from about 0.1% to about 5% by weight of the permeable cement composition.

28. The method of claim 25 wherein the hydraulic cement is chosen from the group consisting of calcium, aluminum, silicon, oxygen, and sulfur.

29. The method of claim 25 wherein the hydraulic cement is chosen from the group consisting of a Portland cement, pozzolanic cement, gypsum cement, high alumina content cement, silica cement, high alkalinity cement, and low-density cement.

30. The method of claim 25 wherein the hydraulic cement is present in the permeable cement composition in an amount ranging from about 20% to about 70% by weight of the permeable cement composition.

31. The method of claim 25 wherein the water is present in an amount sufficient to make the permeable cement composition a pumpable slurry.

32. The method of claim 25 wherein the water comprises fresh water, salt water, or brine.

33. The method of claim 25 wherein the water is present in an amount ranging from about 15% to about 40% by weight of the permeable cement composition.

34. The method of claim 25 wherein the permeable cement composition further comprises a fluid loss additive.

35. The method of claim 34 wherein the fluid loss additive is present in the permeable cement composition in an amount ranging from about 0.1% to about 25% by weight of the permeable cement composition.

36. The method of claim 25 wherein the permeable cement composition is mixed on-the-fly.

37. The method of claim 25 further comprising before step
(a), blending the permeable cement composition and transporting the permeable cement composition to the well site.

38. The method of claim 25 wherein the degradable material is chosen from the group consisting of: a degradable polymer and a dehydrated salt.

39. The method of claim 38 wherein the degradable polymer is chosen from the group consisting of: polysaccharides, chitins, chitosans, proteins, aliphatic polyesters, poly(lactides), poly(glycolides), poly($\epsilon$-caprolactones), poly(hydroxybutyrates), polyanhydrides, aliphatic polycarbonates, poly(orthoesters), poly(amino acids); poly(ethylene oxides), and polyphosphazenes.

40. The method of claim 25 wherein the degradable material further comprises a plasticizer.

41. The method of claim 38 wherein the dehydrated salt is chosen from the group consisting of: anhydrous sodium tetraborate and anhydrous boric acid.

42. The method of claim 25 wherein the degradable material comprises a stereoisomer of a poly(lactide).

43. The method of claim 25 wherein the degradable material is present in an amount ranging from about 5% to about 70% by weight of the composition.

44. The method of claim 25 wherein the degradable material comprises particles having a rod-like shape.

45. The method of claim 25 wherein the cement is a Portland cement present in an amount of from about 20% to about 70% by weight of the permeable cement composition; the water is fresh water present in an amount of from about 15% to about 40% by weight of the cement composition; the degradable material is a poly(lactic acid) particulate present in an amount of from about 5% to about 70% by weight of the permeable cement composition; and wherein the permeable cement composition further comprises a surfactant, present in an amount of from about 0.1% to about 5% by weight of the cement composition.

46. The method of claim 21 wherein the permeable cement proppant matrix has a permeability ranging from about 1 to about 125 darcies.

47. A method comprising the steps of:
(a) placing a permeable cement composition comprising a hydraulic cement, water, and a degradable material capable of undergoing an irreversible degradation downhole in a subterranean formation at a pressure sufficient to create or enhance at least one fracture in the formation; and
(b) allowing the permeable cement composition to set to form a permeable cement proppant matrix in the fracture.

48. The method of claim 47 wherein the permeable cement composition further comprises a surfactant present in an amount sufficient to disperse the hydraulic cement and the degradable material within the permeable cement composition.

49. The method of claim 48 wherein the surfactant is present in the permeable cement composition in an amount ranging from about 0.1% to about 5% by weight of the permeable cement composition.

50. The method of claim 47 wherein the hydraulic cement is chosen from the group consisting of calcium, aluminum, silicon, oxygen, and sulfur.

51. The method of claim 47 wherein the hydraulic cement is chosen from the group consisting of a Portland cement, pozzolanic cement, gypsum cement, high alumina content cement, silica cement, high alkalinity cement, and low-density cement.

52. The method of claim 47 wherein the hydraulic cement is present in the permeable cement composition in an amount ranging from about 20% to about 70% by weight of the permeable cement composition.

53. The method of claim 47 wherein the water is present in an amount sufficient to make the permeable cement composition a pumpable slurry.

54. The method of claim 47 wherein the water is chosen from the group consisting of: fresh water, salt water, and brine.

55. The method of claim 47 wherein the water is present in an amount ranging from about 15% to about 40% by weight of the permeable cement composition.

56. The method of claim 47 wherein the permeable cement composition further comprises a fluid loss additive.

57. The method of claim 56 wherein the fluid loss additive is present in the permeable cement composition in an amount ranging from about 0.1% to about 25% by weight of the permeable cement composition.

58. The method of claim 47 wherein the permeable cement composition is mixed on-the-fly.

59. The method of claim 47 further comprising before step (a) blending the permeable cement composition and transporting the permeable cement composition to the well site.

60. The method of claim 47 wherein the degradable material is chosen from the group consisting of: a degradable polymer and a dehydrated salt.

61. The method of claim 60 wherein the degradable polymer is chosen from the group consisting of: polysaccharides, chitins, chitosans, proteins, aliphatic polyesters, poly(lactides), poly(glycolides), poly($\epsilon$-caprolactones), poly(hydroxybutyrates), polyanhydrides, aliphatic polycarbonates, poly(orthoesters), poly(amino acids); poly(ethylene oxides), and polyphosphazenes.

62. The method of claim 47 wherein the degradable material further comprises a plasticizer.

63. The method of claim 60 wherein the dehydrated salt is chosen from the group consisting of: anhydrous sodium tetraborate and anhydrous boric acid.

64. The method of claim 47 wherein the degradable material comprises a stereoisomer of a poly(lactide).

65. The method of claim 47 wherein the degradable material is present in an amount ranging from about 5% to about 70% by weight of the composition.

66. The method of claim 47 wherein the degradable material comprises particles having a rod-like shape.

67. The method of claim 47 wherein the cement is a Portland cement present in an amount of from about 20% to about 70% by weight of the permeable cement composition; the water is fresh water present in an amount of from about 15% to about 40% by weight of the cement composition; the degradable material is a poly(lactic acid) particulate present in an amount of from about 5% to about 70% by weight of the permeable cement composition; and wherein the permeable cement composition further comprises a surfactant, present in an amount of from about 0.1% to about 5% by weight of the cement composition.

68. The method of claim 47 wherein the permeable cement proppant matrix has a permeability ranging from about 1 to about 125 darcies.

* * * * *